United States Patent Office 3,784,506
Patented Jan. 8, 1974

---

3,784,506
POLYVINYLIDENE FLUORIDE COATING COMPOSITIONS
Joseph A. Vasta, Woodbury, N.J., assignor to E. I. du Pont de Nemours and Company, Wilmington, Del.
No Drawing. Continuation-in-part of applications Ser. No. 37,064, May 13, 1970, and Ser. No. 174,280, Aug. 23, 1971, both now abandoned. This application Feb. 25, 1972, Ser. No. 229,509
Int. Cl. C08g 51/04
U.S. Cl. 260—39 R    3 Claims

ABSTRACT OF THE DISCLOSURE

A coating composition containing polyvinylidene fluoride, an epoxy resin, an aminoplast resin, and optionally, $TiO_2$ or zirconium silicate and zinc, all in an organic liquid carrier, useful for lining water heater tanks and industrial containers.

CROSS-REFERENCE TO RELATED APPLICATIONS

This application is a continuation-in-part of applications Ser. No. 37,064, filed May 13, 1970, and Ser. No. 174,280, filed Aug. 23, 1971, both now abandoned.

BACKGROUND OF THE INVENTION

As every homeowner knows, the interior surfaces of many water heater tanks manufactured for home use are coated with glass to minimize corrosion.

Glass, however, has many failings. First of all, it is brittle and subject to mechanical failure. Secondly, it dissolves slowly in water and so the lining thins over the years to the point where corrosion begins. Third glass itself is porous and permits water to come in contact with the metal through the pores, which causes corrosion. Lastly, a glass tank requires an anode for long life. Besides all this, lining a water heater tank with glass is an expensive operation because of the high temperature required in the fusion step and consequent need for heavy gauge metal.

I have found that these failings are minimized and that a tough, impermeable, long-lasting, organic polymeric coating can be applied to a water heater tank with far less cost by using my compositions. In addition, my coating gives a water heater tank with a useful life comparable to that of a glass tank, without use of anode.

SUMMARY OF THE INVENTION

My coating compositions contain polyvinylidene fluoride, an epoxy resin and an aminoplast resin, all in an organic liquid carrier.

The polyvinylidene fluoride I use in my compositions is of the type described in U.S. Pat. 2,435,537. Such resins are freely available on the market. The resin I prefer to use is "Kynar®," sold by Pennwalt Chemical Company. Polyvinylidene fluoride is ordinarily present in my compositions at a concentration of from 5% through about 90%, preferably 25–75% and even more preferably about 50%, by weight of the binder components.

The epoxy resins I use in my compositions can be any of the well-known condensation products of bisphenol A[1] or bisphenol F[2] with epichlorohydrin, and having gram epoxy equivalent weights of 300–8000, preferably 400–4000, even more preferably 400–2500. The epoxy resins I especially prefer for the quality of the finishes obtained when one uses them are the Epon 1001 through 1009 resins, sold by the Shell Chemical Company. The epoxy resins are ordinarily present in my compositions at concentrations from about 5% through about 90%, preferably 20–60% and even more preferably about 35%, by weight of the binder components.

The aminoplast resin I use in my compositions are condensates of formaldehyde with melamine, urea, benzoguanamine or melaminetoluenesulfonamide. These resins can be prepared according to the directions in U.S. Pats. 2,197,357, 2,508,875 and 2,191,957. I prefer to use a benzoguanamine-formaldehyde resin because of the quality of the coating obtained when it is used.

The aminoplast resins are ordinarily present in my compositions at concentrations of from 5% through about 90%, preferably 5–25%, even more preferably about 15%, by weight of the binder components.

The organic liquid I use as a carrier in my compositions is in the usual case a mixture of those which find their way into the compositions as solvents or carriers for the solid and/or resinous components. These organic liquids are usually diacetone alcohol, aliphatic and aromatic hydrocarbons, ketones and the like, or mixtures of these. Generally speaking, the nature of these liquids is unimportant; it is necessary only that they be compatible with the components of the composition and that they have no adverse effects on the coating itself.

While it is not necessary that my compositions contain a pigment, I have found that the integrity of the resulting films is improved if the compositions contain from about 5% through 100%, preferably 25–75%, even more preferably about 50%, by weight of the binder components, of $TiO_2$.

I have also found that the corrosion protection conferred by my compositions is enhanced if they contain from about 50% through about 900%, preferably 100–700%, and even more preferably about 85–350%, by weight of the binder components, of particulate zinc. The zinc can be in powder or flake form. When these compositions are used, water heaters need contain no magnesium anodes.

The stability and blister resistance of coatings derived from my compositions are also enhanced by adding to the compositions from about 0.1% through about 5%, by weight of the binder components, of a hydrophobic silica such as that sold by the Philadelphia Quartz Company as "Quso." I prefer to use from about 0.5% to about 1.5%, even more preferably 1%, of this material.

In addition, the corrosion protection provided by my compositions is significantly improved if they contain from 5% through about 100% of zirconium silicate, preferably 25% through 75%, even more preferably about 50%, by weight of binder components. The presence of zirconium silicate also increases the hardness, adhesion and acid resistance of finishes derived from these compositions and improve their heat transfer characteristics.

The stability of my compositions containing zirconium silicate and the blister resistance and hydrophobicity of coatings derived from them are also enhanced if they contain from 0.1% through about 5%, preferably 0.5 through 1.5%, even more preferably about 1%, by weight of binder components, of hydrophobic silica (as described above) or polydimethyl siloxane.

The corrosion protection provided by all of these zirconium silicate containing compositions, especially primers, can be even more improved by adding to them from 50 through 900%, preferably 100–700%, even more preferably 85–350%, by weight of binder components, of particulate zinc (as described above).

My compositions can be made by adding suitable amounts of all of the components to a vessel and then pebble-milling or ball-milling the resulting mixture for from 10 to 18 hours, or until the polyvinylidene fluoride ---
[1] Para,para-isopropylidene diphenol.
[2] 4,4'-dihydroxydiphenylmethane.

is wetted and deagglomerated. The resulting dispersion will ordinarily contain from about 50% to about 80% (by weight of the total) of solid material, preferably 50–60%.

This dispersion should then be reduced to spray viscosity with a suitable thinner such as diacetone alcohol or an aromatic naphtha. It can then be sprayed directly on the surface to be coated. It is an advantage of my compositions that they can be applied directly on treated or untreated grit blasted steel.

While one such coating gives good corrosion protection, I have found that my compositions give even better protection if three or more separate coats are applied, each about one mil thick (dry) and each baked after application for 10 minutes at 400–500° F. The final coating is preferably baked for 20 minutes at 475° F.

In cases where the water to be heated is excessively acid or alkaline, on contains salts, I prefer to prime the metal substrate with one or more coats, preferably two, of a composition which contains polyvinylidene fluoride, aminoplast resin, hydrophobic silica and zirconium silicate, all in a liquid carrier, as already described, and which also contains 100–400%, preferably 200%, by weight of the binder components, of particulate zinc. This is then topcoated with one or more coats of the same composition, preferably one, but lacking zinc.

While my compositions are most useful for coating the interior surfaces of water heater tanks, they are also useful for lining boilers, the interior surfaces of pipes and drums, industrial containers, indeed any surface which must come in contact with water at elevated temperatures or with corrosive materials.

DESCRIPTION OF THE PREFERRED EMBODIMENTS

One skilled in the art will be able to practice my invention more easily after reading the following illustrative examples. All parts are by weight.

Example 1

A composition was prepared by blending together

| | Parts |
|---|---|
| Titanium dioxide | 100 |
| Polyvinylidene fluoride | 50 |
| Epoxy resin (Epon 1007, a 40% solution in a 50–50 blend of aromatic hydrocarbon and diacetone alcohol) | 87 |
| Benzoguanamine-formaldehyde resin (66% solids in butanol) | 23 |
| Diacetone alcohol | 10 |
| Solvesso 100 | 10 |

This composition was pebble-milled until the solids were reduced to an average diameter of 1–2 mils.

The composition was reduced to spray viscosity with aromatic hydrocarbon and then applied in three separate coats to grit-blasted steel panels. The first two coats were applied to a thickness of 1 mil (dry) and baked for 10 minutes at 475° C. The third coat was applied at the same thickness, but baked for 20 minutes at 475° F.

The steel panels withstood 30 days immersion in hot water (180° F.) with no observable deterioration of the coating or corrosion of the metal.

Example 2

A composition was prepared by mixing together

| | Parts |
|---|---|
| Polyvinylidene fluoride | 227 |
| Epon 1007 resin (as in Example 1) | 400 |
| Benzoguanamine-formaldehyde resin (66% solids in n-butanol) | 102 |
| Diacetone alcohol | 88 |
| Solvesso 100 | 88 |

This dispersion was ground in a pebble mill until the solids were reduced to an average diameter of 1–2 mils.

To this composition were then added 482 parts of zinc dust.

The composition was mixed, thinned to spray viscosity with Solvesso 100 and applied to a steel panel as in Example 1. The panels withstood immersion in hot water (180° F.) for 30 days with no noticeable deterioration of the coating or corrosion of metal.

Example 3

(A) A composition was prepared by mixing together

| | Parts |
|---|---|
| Titanium dioxide | 16.81 |
| Hydrophobic silica (Quso-51) | 0.34 |
| Polyvinylidene fluoride | 16.81 |
| Benzoguanamine-formaldehyde resin (66% solids in n-butanol) | 7.63 |
| Diacetone alcohol | 14.5 |
| Solvesso 150 | 14.5 |
| Epon 1007 (as in Example 1) | 29.4 |

The resulting dispersion was pebble-milled for about 18 hours and then reduced to spray viscosity with Solvesso 150.

The composition was applied to steel panels as shown in Example 1, with substantially the same result.

(B) In (A) above, titanium dioxide was replaced with an equal amount of zirconium silicate and applied as in Example 1.

The panel withstood immersion in a 10% aqueous NaCl solution at 70° C. for 6 months without blistering and with only slight discoloration of the film.

(C) In (B) above, hydrophobic silica was replaced with the same amount of polydimethyl siloxane (Dow-Corning Co. 200 silicone), to give the same result. Water on the surface of the coating beaded into small drops.

Example 4

(A) To 65.6 parts of the dispersion prepared in Example 3(A) were added 33.3 parts of zinc dust, 0.5 part of Solvesso 100 and 0.5 part of diacetone alcohol.

This was mixed thoroughly, reduced to spray viscosity with Solvesso 100 and then applied to a steel panel as in Example 1, with substantially the same result.

(B) To 65.6 parts of the dispersion in Example 3(B) were added 33.3 parts of zinc dust, 0.5 part of Solvesso 100 and 0.5 part of diacetone alcohol.

This was processed as in (A) above and applied to a steel panel as in Example 1. The panel showed outstanding corrosion resistance.

Example 5

Two coats of the composition of Example 4(A) were applied (total film thickness 2 mils dry) to a zinc phosphate-treated grit-blasted steel panel. Each coat was baked at 450° F. for 10 minutes.

This was then topcoated with one coat of the composition of Example 3(A) (1 mil thick—dry) and baked 20 minutes at 475° F.

This panel withstood more than 60 days immersion in softened water at 180° F., in a 3 hour cycle consisting of (1) emptying ⅓ of the container contents, (2) refilling with water at room temperature, and (3) reheating rapidly to 180° F., with no observable deterioration of the coating.

What is claimed is:
1. A composition consisting essentially of
   (A) 25–75%, by weight of binder components, of $PVF_2$;
   (B) 20–60%, by weight of binder components, of a condensation product of bisphenol A or bisphenol F and epichlorohydrin;
   (C) 5–25%, by weight of binder components, of an aminoplast resin;
   (D) 0.1–5%, by weight of binder components, of hydrophobic silica;

(E) 5–100%, by weight of the binder components, of $TiO_2$; and (F) an organic liquid carrier.

2. The composition of claim 1 additionally containing 50–900%, by weight of binder components, of particulate zinc.

3. A composition consisting essentially of
(A) 25–75%, by weight of binder components, of $PVF_2$;
(B) 20–60%, by weight of binder components, of a condensation product of bisphenol A or bisphenol F and epichlorohydrin;
(C) 5–25%, by weight of binder components, of an aminoplast resin;
(D) 0.1–5%, by weight of binder components, of hydrophobic silica;
(E) 5–100%, by weight of the binder components, of zirconium silicate; and
(F) an organic liquid carrier.

References Cited

UNITED STATES PATENTS

| | | | |
|---|---|---|---|
| 3,449,466 | 6/1969 | Gerek et al. | 260—900 X |
| 3,408,318 | 10/1968 | Madison | 260—37 EP X |
| 3,324,069 | 6/1967 | Koblitz et al. | 260—834 UX |

FOREIGN PATENTS

| | | | |
|---|---|---|---|
| 651,190 | 10/1962 | Canada | 260—834 |

OTHER REFERENCES

Lee et al.: Handbook of Epoxy Resins, McGraw-Hill Book Co., 1967, pp. 14–3, 14–4.

LEWIS T. JACOBS, Primary Examiner

U.S. Cl. X.R.

260—32.8 N, 33.6 EP, 37 EP, 41 R, 41 B, 834, 837